US007193782B2

(12) United States Patent
Menon et al.

(10) Patent No.: US 7,193,782 B2
(45) Date of Patent: Mar. 20, 2007

(54) SYSTEM AND METHOD FOR MANIPULATING MICRO-PARTICLES USING ELECTROMAGNETIC FIELDS

(75) Inventors: Rajesh Menon, Cambridge, MA (US); Dario Gil, Cambridge, MA (US); George Barbastathis, Boston, MA (US); Henry I. Smith, Sudbury, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/748,058

(22) Filed: Dec. 30, 2003

(65) Prior Publication Data

US 2005/0146794 A1 Jul. 7, 2005

(51) Int. Cl.

| | |
|---|---|
| ***G02B 27/10*** | (2006.01) |
| ***G02B 26/00*** | (2006.01) |
| ***H01S 1/00*** | (2006.01) |
| ***G01N 1/18*** | (2006.01) |

(52) U.S. Cl. ...................... 359/626; 359/619; 359/291; 250/251; 436/177

(58) Field of Classification Search ................ 359/618, 359/619, 621, 626, 291; 385/16–18, 147; 356/394; 250/251; 435/7.1; 372/6, 19; 436/172, 177

See application file for complete search history.

(56) References Cited

U.S. PATENT DOCUMENTS

| | | | | |
|---|---|---|---|---|
| 5,512,745 | A | 4/1996 | Finer et al. | 250/251 |
| 5,620,857 | A | 4/1997 | Weetall et al. | 435/7.1 |
| 5,887,009 | A * | 3/1999 | Mandella et al. | 372/6 |
| 6,266,476 | B1 * | 7/2001 | Shie et al. | 385/147 |
| 6,373,868 | B1 * | 4/2002 | Zhang | 372/19 |
| 6,775,049 | B1 * | 8/2004 | So | 359/291 |
| 6,864,980 | B2 * | 3/2005 | Te Kolste et al. | 356/394 |
| 6,991,939 | B2 * | 1/2006 | Walt et al. | 436/172 |
| 2003/0032204 | A1 | 2/2003 | Walt et al. | |

OTHER PUBLICATIONS

E.R. Lyons & G.J. Sonek, "Confinement and bistability in a tapered hemispherically lensed optical fiber trap", Applied Physics Letters, American Institute of Physics. New York, vol. 66 No. 13, Mar. 27, 1995, pp. 1584-1586.

Nicholas G. Dagalakis et al., "Micro-Mirror Array Control of Optical Tweezer Trapping Beams", Nanotechnology 2002. IEEE-NANO 2002. Proceedings of the 2002 2nd IEEE Conference on Aug. 26-28, 2002, Piscataway, NJ, Aug. 26, 2002. pp. 177-180.

* cited by examiner

*Primary Examiner*—Ricky Mack
*Assistant Examiner*—Jack Dinh
(74) *Attorney, Agent, or Firm*—Gauthier & Connors LLP

(57) ABSTRACT

An optical manipulation system is disclosed that includes an array of focusing elements, which focuses the energy beamlets from an array of beamlet sources into an array of focal spots in order to individually manipulate a plurality of samples on an adjacent substrate.

24 Claims, 5 Drawing Sheets

SYSTEM AND METHOD FOR MANIPULATING MICRO-PARTICLES USING ELECTROMAGNETIC FIELDS

This invention was made with support from the United States government under Grant No. DAAD19-01-1-0330, and the United States government has certain rights to the invention.

BACKGROUND

The present invention relates to traps used to trap and manipulate particles, and particularly relates to optical traps that employ electromagnetic fields to trap and manipulate micro-particles.

Optical traps generally involve the use of a beam or focused field of electromagnetic energy that may be directed toward a small sample particle (on the order of an atom to as large as even tens of micrometers). The electromagnetic energy may be absorbed, reflected or refracted, and the small forces associated with such absorption, reflection or refraction may be used to trap or move the small sample particle. For example, U.S. Pat. No. 5,512,745 discloses a system and method for optically trapping micrometer-sized spheres to which molecules may be attached. The system includes a feedback circuit that utilizes a quadrant photodetector and a focal region location unit such as an acousto-optic modulator or galvanometer mirror. U.S. Pat. No. 5,620,857 also discloses a system in which sample elements such as analytes are adhered to polarized microspheres of glass or latex with diameters on the order of 4.5 μm. The analytes are detected and quantitated in accordance with disclosed systems.

Such systems, however, require the use of multiple laser beams in order to provide multiple optical traps (or light tweezers as they are sometimes called) to manipulate multiple samples simultaneously. Moreover, it is not practical in certain applications to employ more than one light trap in a small sample region.

There is a need therefore, for a system and method for efficiently and economically providing for multiple optical traps.

SUMMARY OF THE INVENTION

The invention provides an optical manipulation system that includes an array of focusing elements, which focuses the energy beamlets from an array of beamlet sources into an array of focal spots in order to individually manipulate a plurality of samples on an adjacent substrate. In various embodiments, the system includes an array of sources or an array of micro-mirrors to provide the array of beamlets. In further embodiments, the system may provide for the independent manipulation of particles or parts of larger elements by adjusting the micro-mirrors.

BRIEF DESCRIPTION OF THE DRAWINGS

The following description may be further understood with reference to the accompanying drawings in which.

The drawings are shown for illustrative purposes and are not to scale.

DETAILED DESCRIPTION OF THE ILLUSTRATED EMBODIMENTS

The invention provides a system that may be used to manipulate many particles in parallel using an array of optical traps. The traps are created by an array of diffractive elements. The particle manipulation is controlled by spatial-light multiplexers that switch (or gray-scale) light incident on each diffractive element. Each particle may be independently manipulated by controlling the angle of light on the diffractive element using the multiplexers. All of the particles may also be moved in the lateral plane simultaneously by scanning the sample on a stage.

A system in accordance with an embodiment may employ an array of sources. The sources may be semiconductor lasers, laser diodes, light emitting diodes (LEDs), vertical cavity surface emitting lasers (VCSELs). The light from each element may be collimated using an array of aligned lenses. These may be microfabricated along with the array of sources in a self-aligned manner. The light from each element is focused using an array of diffractive elements. The diffractive elements may be zone plates, spiral zone plates, bessel zone plates or microlenses. Thus, an array of optical traps may be created in the sample, which is mounted on a translation stage. By moving the stage, and simultaneously controlling the light output from each element of the source array, the particles may be manipulated in an arbitrary manner.

Figure 1:
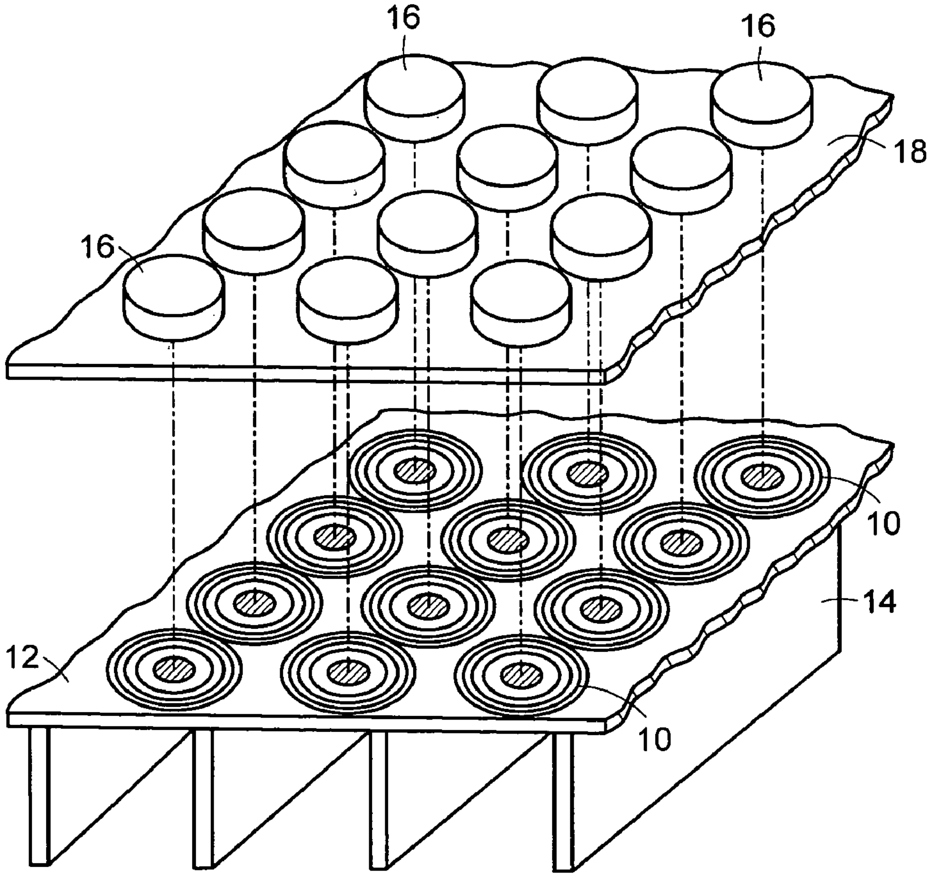
FIG. 1 shows an illustrative diagrammatic exploded view of an array of energy sources and an array of diffractive elements for use in a system in accordance with an embodiment of the invention.

For example, the lenses may include an array of Fresnel zone plates as disclosed in U.S. Pat. No. 5,900,637, the disclosure of which is hereby incorporated by reference. As shown in FIG. 1, an array of focusing elements 10 may be arranged on a substrate 12, wherein the area under each zone plate defines a unit cell. The array maybe supported on a thin membrane with vertical, anisotropically-etched silicon (Si) joists 14 for rigid mechanical support that divide rows of unit cells. Each zone plate is responsible for manipulating particles within its unit cell. The silicon joists are intended to provide additional rigidity to the array while minimizing obstruction. Methods of anisotropic etching of silicon are well known, and are capable of producing in silicon joists of about one or a few micrometers in thickness. In alternative embodiments of the invention, the joists may not be necessary, and the substrate need not be formed of silicon. The membrane is formed of a material that is transparent to the beam source. If the source is 4.5 nm x-ray, then the membrane may be formed of a thin carbonaceous material. If deep UV or UV or visible radiation is used, the zone plates may be made on a glass substrate, e.g., using grooves cut into a glass plate or membrane.

An array of individually selectable sources 16 is also provided on a support substrate 18 such that each source is aligned with one of the focusing elements 10. Each source

16 may also include a microlens for directing a substantially collimated beamlet toward an associated focusing element. In certain embodiments, the array of sources may have an array of diffractive or refractive lenses to collimate the radiation, and in certain embodiments, each of the lenses may be coupled directly to and thereby included with each of the sources 16. The sources may further include a variety of other sources such as x-ray sources or electron beam sources. These may be microfabricated in arrays, and may provide extremely high modulation frequencies (about 1 GHz), which translates to very high manipulation speeds.

The focusing elements may be any of a variety of diffractive and/or refractive elements including those disclosed in U.S. patent application Ser. No. 10/624,316 filed Jul. 22, 2003, (the disclosure of which is hereby incorporated by reference) which claims priority to U.S. Provisional Applications Ser. Nos. 60/397,705 and 60/404,514, including, for example, amplitude and/or phase Fresnel zone plates, blazed Fresnel zone plates, bessel zone plates, photon sieves (e.g., amplitude photon sieves, phase photon sieves, or alternating phase photon sieves), and the diffractive focusing elements may be apodized. These may be microfabricated in large arrays as well, and may be designed to compensate for wavefront characteristics in the radiation output from the source array to achieve, for example, the smallest possible focal spot.

Figure 2:
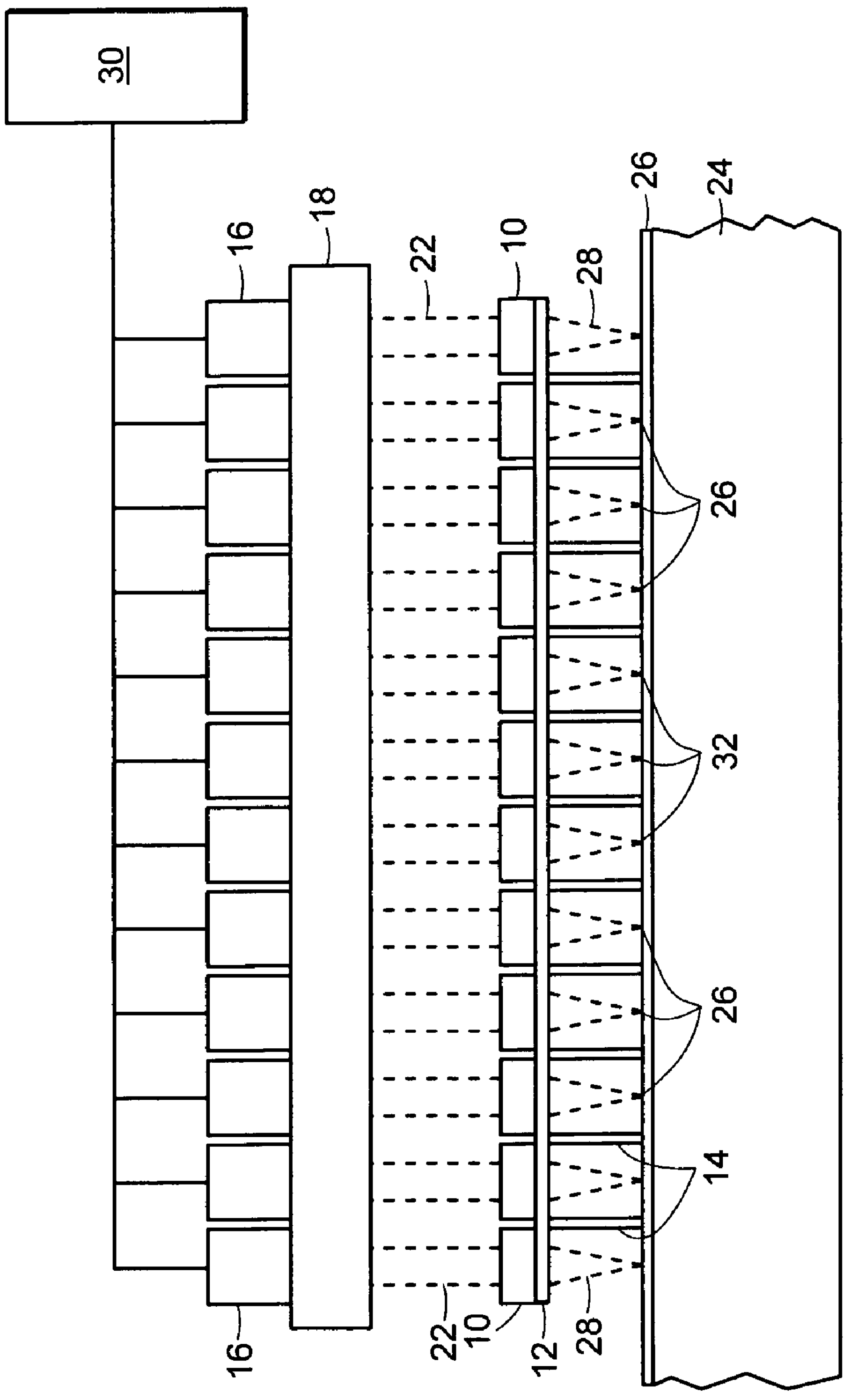
FIG. 2 shows an illustrative diagrammatic sectional view of an array of energy sources and an array of diffractive elements for use in a system in accordance with another embodiment of the invention.

As shown in FIG. 2, incident beams 22 from the array of beam sources and microlenses 16 are focused onto a substrate 24 as focused beams 28. The substrate 24 includes particles 26 that may be manipulated by the individual beamlets. The incident beams 22 are individually turned on and off in response to commands from a control computer 30. Shutter devices may further be interposed on either side of the array of diffractive elements 10 in certain embodiments.

Each of diffractive elements 10 on the membrane (or substrate) 12 is able to focus an individual beam 22 to a fine focal spot 32 on the substrate 24, which is supported on a positioning stage. To trap or manipulate individual particles 26, the substrate is scanned under the array, while the individual beams 28 are turned on and off as needed by means of the individual energy sources 16, wherein one energy source is associated with one zone plate. By selectively modulating each source in the array while scanning a substrate, one may create arbitrary trapping combinations. Such a system may be extremely compact (integrated) and have very high individual selectivity (resolution) and throughput.

The arrays of sources and of focusing elements may be one or two dimensional. The array of sources direct radiation onto the array of diffractive focusing elements. There should be a one to one correspondence between each light source, each lens and each diffractive focusing element. The radiation incident on each diffractive focusing element is focused into an individual spot. The sources and focusing-lens arrays may be microfabricated on separate substrates. These substrates may be aligned and bonded together, thereby creating a very compact, parallel optical trap system.

The invention also provides a method for performing optical trapping using an array of light sources (which again, may be diode lasers, LEDs, VCSELs etc.) and an array of focusing lenses (which again may be diffractive or refractive or any combination thereof). The natural parallelism of such a multi-optical column trapping technique when combined with the high modulation frequencies of light sources may result in a high resolution and high throughput optical trapping system. The proposed method consists of the following steps: a) providing an array of sources including but not limited to VCSELs, LEDs, laser diodes, sources of any wavelength, x-ray sources and even electron beam sources; b) providing an array of collimating microlenses or diffractive lenses to collimate and clean-up the source array output beam; c) providing an array of focusing lenses that may be zone plates, photon sieves, bessel zone plates, other diffractive lenses, refractive lenses, combinations of diffractive and refractive lenses, or any other elements that may be used to focus the incident radiation into an array of spots; d) individually switching the sources on and off; and e) scanning a substrate on a stage underneath the focused beams to create a pattern of optical traps. Note that, the modulation of such sources may be extremely fast. Moreover, such sources may grayscale their intensity for variations in particle positioning and to correct for light non-uniformity across the source array. The system may also be used in an immersion fluid.

Figure 3:
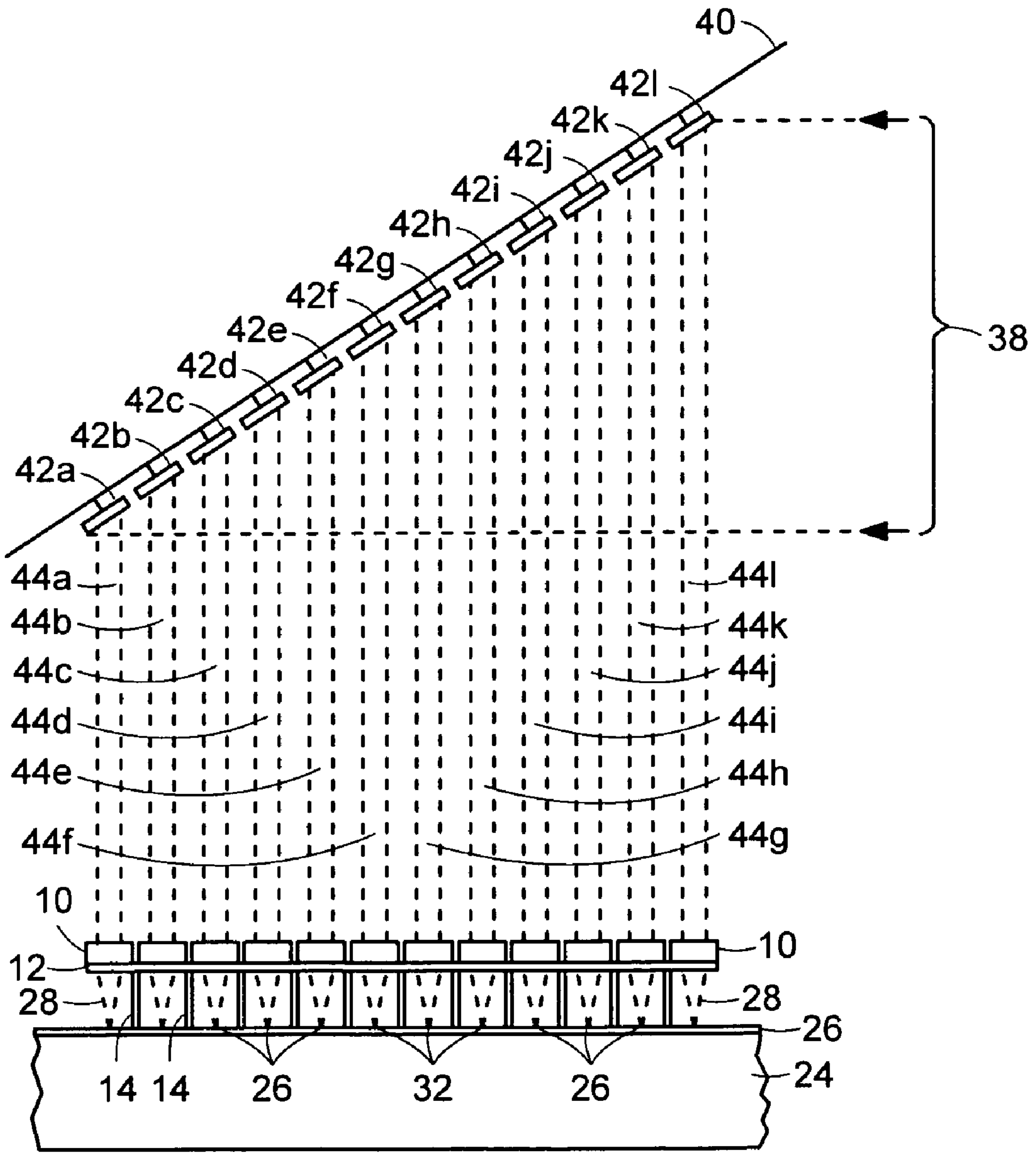
FIG. 3 shows an illustrative diagrammatic sectional view of a system in accordance with a further embodiment of the invention employing a spatial light modulator.

FIG. 3 shows a system in accordance with another embodiment of the invention using a single source 38 and a multiplexing module 40. The multiplexing module 40 may include an array of micromirrors 44, an LCD or other form of spatial light modulator. The module 40 breaks the incoming light into an array of beamlets 44*a*–44*l* that may be selectively independently switched on and off. When on, each beamlet is focused into a spot using one element in the focusing array. While the sample is scanned on the stage, the multiplexers may modulate the beamlets, and particles therefore may be manipulated arbitrarily by switching each beamlet on and off using the associated micromirror.

Figure 4:
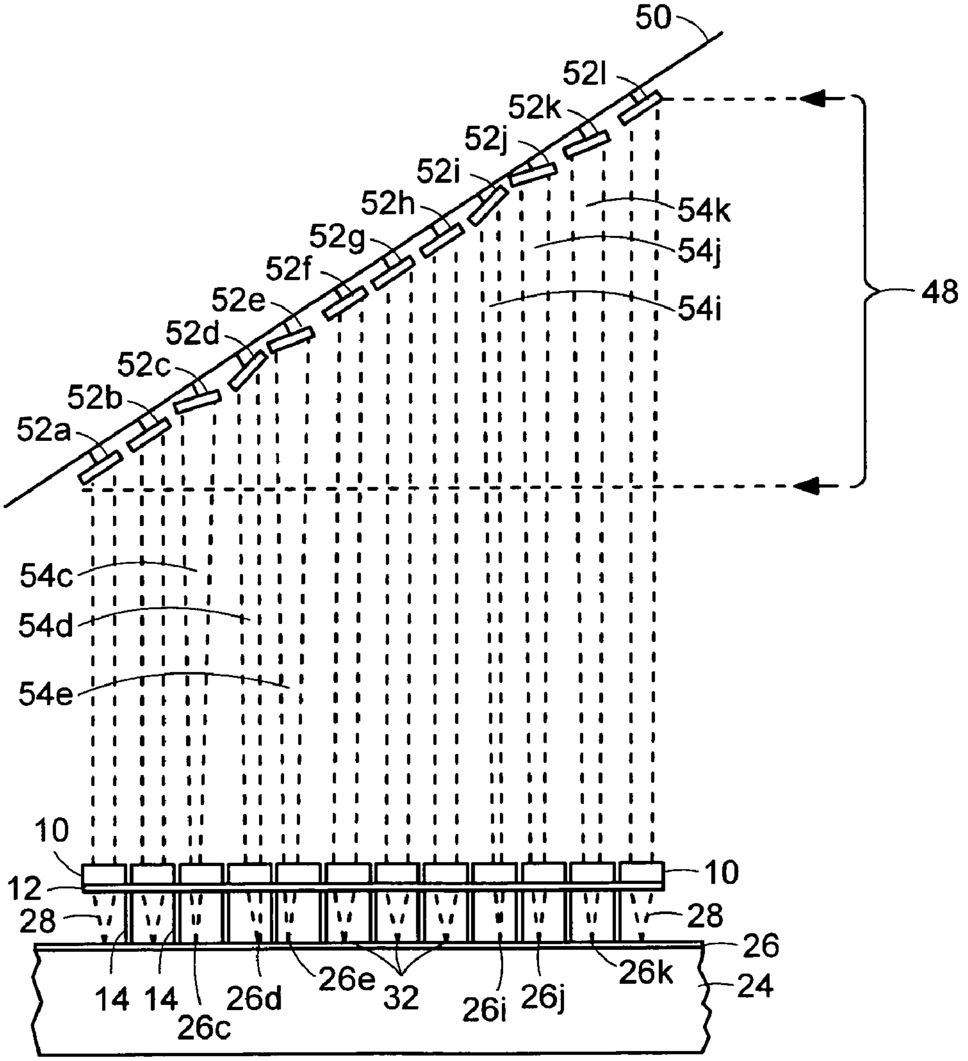
FIG. 4 shows an illustrative diagrammatic sectional view of a system in accordance with a further embodiment of the invention employing a spatial light modulator.

FIG. 4 shows a system in accordance with a further embodiment of the invention using a single source 48 and a multiplexing module 50. As with the system of FIG. 3, the multiplexer may be a micromirror array, LCD or other form of spatial light modulator. The multiplexer breaks the incoming light into an array of beamlets 52*a*–52*l*. Each beamlet is focused into a spot using one element in the focusing array. The sample may or may not be mounted on a translation stage. The trapped particle may be moved by changing the angle of the incident light using the multiplexing element. For example, the angle of incidence of one diffractive-focusing element can be changed by controlling the tilt of the corresponding micromirror (e.g., 42*c*, 42*d*, 42*e*, 42*i*, 42*j* and 42*k*) in a micromirror-array-based multiplexer. The diffractive-focusing element will focus the obliquely-incident-plane wave into an off-axis spot (as shown in FIG. 4). This swiveling of the focused spot may be used to move the trapped particles 26*c*, 26*d*, 26*e*, 26*i*, 26*j* and 26*k* as shown. In this case, each trapped particle in the array may be moved in an arbitrary fashion. The multiplexer may be a spatial light modulator such as the DMD micromirrors sold by Texas Instruments, Inc. of Dallas Tex., microshutters, grating-based modulators (such as the grating light valves sold by Silicon Light Machine of Sunneyvale Calif.) or LCDs. The array of diffractive-focusing elements may take the form of amplitude or phase zone plates (to form focused spots on the sample), phase zone plates (to form annular-shaped spots on the sample), or bessel zone plates (to produce focused spots with large depth-of-focus). These elements may be microfabricated using planar processes.

Figure 5:
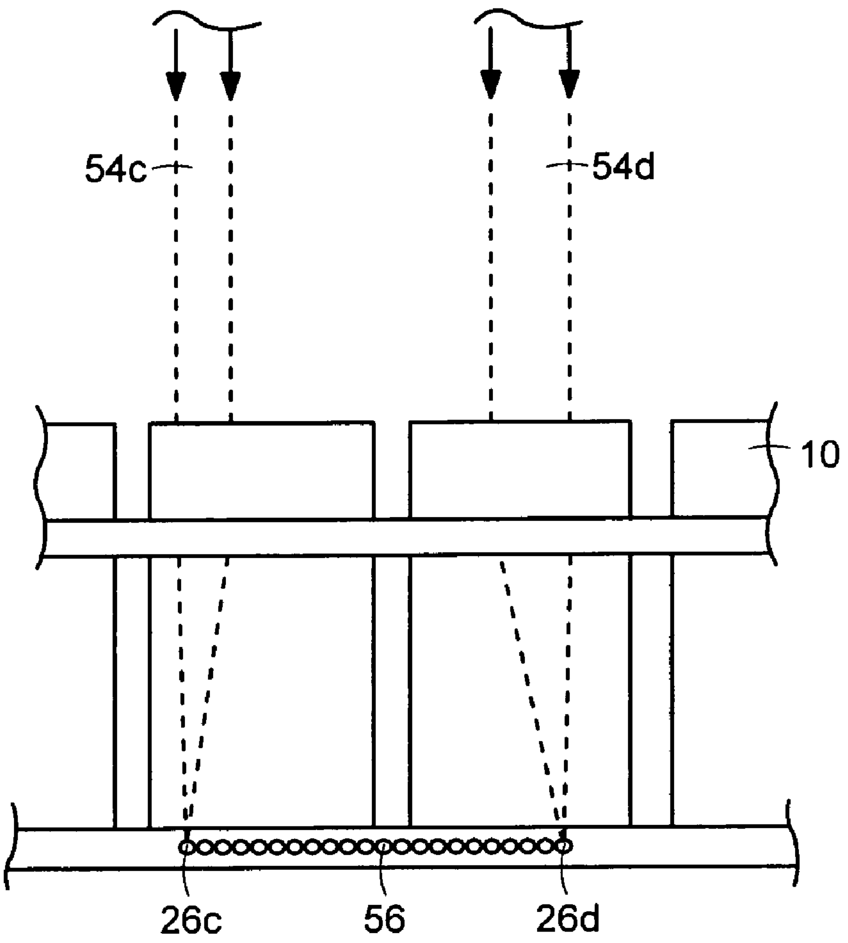
FIG. 5 shows an illustrative diagrammatic sectional view of a portion of the system shown in FIG. 4 enlarged to show an element that is being manipulated.

As shown in FIG. 5, particles 26*c* and 26*d* may be moved with respect to one another, and if each particle is attached to a common element 56, the element 56 may be stretched by the beamlets 54*c* and 54*d*. Systems of the invention may be used, therefore, not simply to move certain particles with respect to other particles by trapping some particles and moving the substrate, but also to move particles toward or away from one another without requiring that the underlying substrate be moved. If the particles are formed as part of a larger element (such as a DNA chain), the element may be moved, stretched or even broken up as desired. The ability to provide multiple independently selectable optical traps at such high resolution may provide numerous applications in a wide variety of fields.

Those skilled in the art will appreciate that numerous modifications and variations may be made to the above disclosed embodiments without departing from the spirit and scope of the invention.

What is claimed is:

1. An optical manipulation system comprising an array of focusing elements, each of which focuses an electromagnetic energy beam from an array of beamlet sources into an array of focal spots in order to manipulate a plurality of samples on an adjacent substrate, said beamlet sources each including adjustment means, each of which is associated with a focusing element to selectively direct a beamlet of electromagnetic energy via the associated focusing element toward a plurality of selectable focal locations with respect to the focusing element on the adjacent substrate.

2. The optical manipulation system as claimed in claim 1, wherein said array of beamlet sources includes an array of micromirrors.

3. The optical manipulation system as claimed in claim 1, wherein said array of focusing elements includes an array of diffractive elements.

4. The optical manipulation system as claimed in claim 1, wherein said array of beamlet sources includes an array of light emitting diodes.

5. The optical manipulation system as claimed in claim 1, wherein said array of beamlet sources includes an array of semiconductor lasers.

6. The optical manipulation system as claimed in claim 1, wherein said array of beamlet sources includes an array of vertical cavity surface emitting lasers.

7. The optical manipulation system as claimed in claim 1, wherein said array of beamlet sources includes a spatial light modulator.

8. The optical manipulation system as claimed in claim 1, wherein said array of focusing elements includes an array of Fresnel lenses.

9. The optical manipulation system as claimed in claim 1, wherein said array of focusing elements includes an array of zone plates.

10. The optical manipulation system as claimed in claim 1, wherein said system further includes an array of microlenses interposed between said array of sources and said array of focusing elements.

11. A parallel optical manipulation system comprising an array of focusing elements, and an array of sources, wherein each source is positioned to selectively direct electromagnetic energy toward a focusing element, said beamlet sources each including adjustment means, each of which is associated with a focusing element to selectively direct a beamlet of electromagnetic energy via an associated focusing element toward a plurality of selectable focal locations with respect to each associated focusing element on an adjacent substrate, and each focusing element is positioned to direct a focused beam toward a particle to be manipulated such that a plurality of independent pairs of light traps is configured to be provided.

12. A parallel optical manipulation system comprising an array of focusing elements, and an array of directionally selective elements, wherein each directionally selective element is positioned to selectively direct electromagnetic energy toward a plurality of selectable locations on an adjacent substrate via an associated focusing element, and each focusing element is positioned to direct a focused beam toward a particle to be manipulated such that each directionally selective element is configured to be employed to move a focused beam with respect to an associated focusing element to thereby manipulate a particle.

13. The parallel optical manipulation system as claimed in claim 12, wherein said array of directionally selective elements includes an array of micromirrors.

14. The parallel optical manipulation system as claimed in claim 12, wherein said array of directionally selective elements includes an array of spatial light modulators.

15. The parallel optical manipulation system as claimed in claim 12, wherein said system further includes a single source of electromagnetic energy that is directed toward said array of directionally selective elements.

16. The parallel optical manipulation system as claimed in claim 12, wherein said directionally selective elements are configured to be used to selectively switch on and off said electromagnetic energy that is directed toward a respective focusing element.

17. The parallel optical manipulation system as claimed in claim 12, wherein said directionally selective elements are each associated with a focusing element, and said directionally selective elements are configured to be used to selectively move with respect to an associated focusing element, said electromagnetic energy that is directed toward the associated focusing element.

18. A parallel optical manipulation system for manipulating particles using electromagnetic energy, said system comprising an array of focusing elements and an array of micro-mirrors each of which is associated with a focusing element and is configured to be moved with respect to the associated focusing element to selectively direct a beamlet of electromagnetic energy toward a plurality of selectable locations with respect to each associated focusing element on an adjacent substrate via said associated focusing element.

19. A method of manipulating particles using electromagnetic energy, said method comprising the steps of:

- providing an array of beamlets that are directed toward an array of focusing elements;
- focusing each of said beamlets toward a plurality of particles with an array of focusing elements; and
- selectively controlling each of said beamlets by selectively directing a beamlet toward a plurality of selectable locations with respect to the associated focusing element on an adjacent substrate via an associated focusing element to manipulate said plurality of particles.

20. The method as claimed in claim 19, wherein said method further includes a step of providing an array of sources to provide said array of beamlets.

21. The method as claimed in claim 19, wherein said method further includes a step of providing an array of directionally selectively elements to provide said array of beamlets.

22. The method as claimed in claim 21, wherein said directionally selective element includes an array of micromirrors.

23. A method of manipulating particles using electromagnetic energy, said method comprising the steps of:

- providing an array of micro-mirrors that receive an electromagnetic field and provide an array of beamlets that are directed toward an array of focusing elements;

focusing each of said beamlets toward a plurality of particles; and selectively controlling each of said micromirrors to selectively direct a beamlet toward a plurality of selectable locations with respect to an associated focusing element on an adjacent substrate via the associated focusing element to manipulate said plurality of particles.

24. The method as claimed in claim 23, wherein said step of selectively controlling each of said micromirrors to manipulate said plurality of particles involves stretching an element that includes at least two particles.

* * * * *